3,803,319
// TREATING HYPERLIPEMIA WITH ISATIN
// Luigi Musajo, Via Marzolo 5, Padua, Italy
// No Drawing. Filed Jan. 4, 1971, Ser. No. 103,796
// Int. Cl. A61k 27/00
// U.S. Cl. 424—274                                    5 Claims

ABSTRACT OF THE DISCLOSURE

Isatin, which is 2,3-dioxo-indolin, used in daily dosages of 0.5–300 mg. in a carrier or vehicle with or without vitamins or other active ingredients acts to reduce hyperlipemia.

---

The importance of hyperlipemia in the genesis of many diseases, particularly of athero and arteriosclerosis, is well known. Hyperlipemia may present itself as a primative alteration (essential hyperlipemia), or secondary to other morbid events. In all these circumstances it is often responsible for severe vasal alterations, from reduction of the lumen to complete obliteration of the arterial vessels, with severe consequences for the various organs.

The systems proposed for controlling hyperlipemia are numerous, but they cannot be considered completely satisfactory, and hypolipidic and hypoglycidic diet therefore, is successful only in a few cases.

Heparin has a clarifying effect on serum, but it is active only if administered parenterally and needs to be injected two-three times daily and is rather unmanageable due to its specific anticoagulant activity.

The heparinoids extracted from various animal organs have a very weak antilipemic effect.

Dry thyroid and triiodothyronine both accelerate the combustion of fats, but are far from being free from secondary effects, as the doses necessary for reducing lipemia are almost never tolerated by the patients; moreover they cannot be employed in cardiopaths.

It is not feasible to enumerate all the other durgs proposed for this purpose, practically without important results and by now of extremely limited use. But, Chlofibrate, ethyl-2(p-chlorophenoxy) - 2 - methyl-propionate, which has been shown to have a good effect, must be mentioned. It has however to be employed over long periods and in high doses (2000 mg. daily) and is sometimes badly tolerated, owing to the rise in digestive disturbances.

The object of the present discovery is a composition capable of achieving normalization of the lipidic content of serum, and which does not present the drawbacks and uncertainties of the products so far known and employed for this purpose. This extremely useful and unforseen result is achieved because the above mentioned composition contains, as an active constituent, Isatin (2,3-dioxo-indolin). This substance is known chemically; moreover, it has been studied sporadically from some biological points of view.

Karl Gaede and Greta Küppers-Frischer (Klinische Wochenschrift, 26, Heft 45/46, Dec. 1, 1948, p. 720) have considered this substance as being capable of producing a hyperglyemic effect. Müller M. (Med. exp., 7, 1962, p. 155) has observed that Isatin prolongs in the mouse the duration of the sleep provoked by hexobarbital, sets up opposition to electrical or pentetrazolic tonic convulsions and inhibits monoaminooxydase activity in lever homogenates. Müller M. and Schmiedel R. (Med. exp., 11, 1964, p. 149) consider Isatin but still from the anticonvulsive point of view. Again Müller M. and Schmiedel R. (Acta biol. med. german., 14, 1965, p. 158) examine Isatin in relation to monoamino-oxydase; the effect is found to be insignificant.

Müller M. and Schultrich S. (Acta biol. med. german., 17, 1966, p. 307) reconsider Isatin for the hyperglycemic effect; they do not confirm previously published data, but note only a very weak effect in rats, guinea pigs and rabbits. Hart S. L. and McColl I. (J. Pharmacy and Pharmacology, 19, 1967, p. 70) consider Isatin together with purgative drugs with regard to intestinal absorption of glucose.

Yet, never before, have the antihyperlipemic properties of Isatin been pointed out, and the possibility therefore, of their use in this sense.

The object of the discovery is therefore, the antihyperlipemic effect of Isatin, an effect now discovered and utilized for the first time, in order to combat those alterations of the organism consequent upon hyperlipemia, which represent a severe danger for human health.

Acute and subacute toxicity of Isatin has been preliminarily examined. For this purpose the experiments have been performed according to the advice of the O.M.S. (W.H.O., Organisation Mondiale de la Sante, Genève, Rapport Technique No. 341, 1966).

The expriments carried out have shown that the substance in question present a particularly low level of toxicity. In the mouse, for example, acute toxicity by oral administration is DL 50 g. 1.5/kg.

From the data gathered in the tests of sub-acute toxicity, it can be concluded:

(1) The rise in body weight is like that of the control animals.
(2) The count of erythrocytes, the value of hemoglobin and the count of leucocytes and platelets has not shown significant variations with respect to the controls.
(3) The weight of the organs of the animals sacrificed has not shown significant variations with respect to the controls.
(4) Mating of treated animals with other treated animals and with animals of the same strain but untreated, has given a completely normal birthrate and the offspring have undergone no damage.
(5) The anatomico-pathological examination of the organs of the animals sacrificed at the end of the treatment has not shown appreciable morbid phenomena.

On the other hand, corresponding to the results of the researches done on the subject by the inventor, the anti-hyperlipemic activity of Isatin is connected to the activating action that is shown with regard to some $B_6$-dependent enzymatic systems (pyridoxal-phosphate dependent systems) and precisely to troxyn-decarboxylase, kynurenin-transaminase and kynureinnase. Such an activating action has been widely ascertained in numerous experiments "in vitro," that have been also done with other research workers.

This circumstance suggested the use of Isatin, for the above specified purposes, in very small doses, very far from toxic, and therefore certainly suitable for experimentation in man.

According to this invention, the composition to use in order to influence the lipidic content of the serum is obtained by mixing the Isatin with any known excipient in use in pharmaceutical preparations to be administered orally, both if solid (sugar, starch, stearates and the like) and if constituted by any known vehicle suitable for keeping the active substance in suspensions or in emulsions, or it may be constituted by a mixture of liquid vehicles suitable for increasing solubility of the said active substance.

Oral administration seems to be particularly indicated for the use to which the composition itself is destined, and therefore the composition can be prepared in any solid pharmaceutical form suitable to be ingested (powder, capsules, tablets, pills, etc.), or in peculiar proper pharmaceutical liquid forms, that consider the limited solubility in water of the active substance (suspensions, emulsions or any liquid vehicle or mixtures of them). Eventually, the composition in question can also be employed in the form of suppositories. For this purpose, the finely subdivided, or better micronized, substance can be used for the preparation of suppositories in excipient vehicles on the base of various types of adeps solidus, or of polyethyleneglycols.

Isatin can also be used parenterally as long as known suitable liquid vehicles or mixtures of them are used, that are capable of increasing the solubility, or when Isatin is transformed into known soluble derivatives that can be prepared directly from it. For the same purpose lyophilized suspensions to be regenerated at the moment of injection may also be used.

Orally administered compositions can be employed in a dose of a few tens of milligrams of active substance daily: a dose that is very very far from toxic. A dose of 30 mg. daily has been shown, for example, to be very effective in obtaining surprising effects in the reduction of serum hyperlipemia. The amount of active substance in the composition may vary after daily division.

The substance has never shown undesirable side-effects. It has been always perfectly tolerated and some patients, moreover, have noticed a marked sense of well-being while taking the substance.

The different organic functions "hemopoietic, hepatic, renal) have definitely not been influenced by the use of these preparations. The lipidic status has been promptly influenced in all patients.

With particular regard to the study of the lipidic status of the serum, this has been carried out in patients suffering from modest, discrete or severe arteriosclerosis, before and after a month of treatment with small doses of Isatin.

In these cases the basal values have nearly always shown an increase of all the lipidic fractions explored, particularly the free and esterified fatty acids, total cholesterol, free cholesterol, triglycerides and beta-lipoproteins. Control after a month has revealed a net decrease of all the altered values. In some cases one reaches complete normalization of the humoral values.

It seems, that such a notable and rapid effect has not been obtained by any other preparations so far known, nor by any diet.

The following values have been investigated:

(1) esterified total fatty acids
(2) free fatty acids
(3) total cholesterolemia
(4) esterified cholesterol
(5) free cholesterol
(6) phospholipids
(7) triglycerides
(8) beta-lipoproteins
(9) $\frac{\text{esterified cholesterol}}{\text{total cholesterol}}$ ratio
(10) $\frac{\text{total cholesterol}}{\text{phospholipids}}$ ratio The results obtained in more than thirty experimental cases are summarized in the table.

TABLE

[Percentage variations of the principal serum lipidic fractions after a month of treatment with 30 mg. daily of Isatin divided into three doses per os in capsules of 10 mg. each [1]]

| Lipidic fractions | No. cases | Mean variation,[2] percent | Minimal variation,[3] percent | Maximal variation,[4] percent |
|---|---|---|---|---|
| Total esterified fatty acids | 32 | −27.1 | 0 | −85.3 |
| Non-esterified fatty acids | 32 | −19.5 | 0 | −95.6 |
| Total cholesterol | 32 | −27.2 | 0 | −56.3 |
| Phospholipid | 32 | −9.9 | 0 | −41.6 |
| Triglycerides | 32 | −25.6 | 0 | −85.5 |
| Beta-lipoproteins | 32 | −16.6 | 0 | −76.5 |

[1] The ratio esterified cholesterol: total cholesterol reaches normal values in all cases.
[2] The mean variation represents the average of the reductions obtained in the experimental cases.
[3] A 0 indicates the very low, practically insignificant, variations found when the single basal values were to be considered normal.
[4] The values obtained after 5 days in the I case to which attention will be drawn later.

From the whole of the collected data the following considerations can be made:

(A) Isatin acts in very low doses, in some cases even in doses of only 0.5 mg. pro die. However, the maximum doses, which could be of 300 mg., pro die, are still very far from those that produce toxicity in animals. In general, only a few tens of milligrams are sufficient per day, 30 mg. for example.

(B) The lipidic status becomes regular when the values of the various fractions explored were initially altered. In this case these tend to move towards those considered normal. When these values present no alterations at the beginning of therapy, they remain unaltered even at the end. When hyperlipemia concerns only some lipidic fractions, there are those that tend to regularize themselves.

(C) All the data gathered from the experiments performed collaterally lead one to consider the effectiveness of the therapy with regard to the readjustment of hyperlipermia and of the humoral alterations connected with it. This makes it possible to associate Isatin with other drugs, also vitamin and polyvitamin products.

In accordance with the invention some surprising results must be mentioned here that were obtained in some cases and which can be considered indicative of the effect of Isatin:

(I) In a case of essential hyperlipemia, with an extraordinarily altered lipidic status at the commencement of administration, five days of treatment with three doses of 10 mg. of active substance each day—a total of 30 mg. daily—were sufficient to change the serum from intensely milky to perfectly limpid. The total esterified fatty acids from mg. 4100% to mg. 600%; total cholestrolemia from mg. 595% to mg. 260%; free cholesterol from mg. 347% to mg. 67%; phospholipids from mg. 476% to mg. 278%; triglycerides from mg. 2740% to mg. 396%; beta-lipoproteins from mg. 3640% to mg. 855%.

Seven days after interruption of treatment, the values tended to rise.

(II) In a second case the lipidic status at the beginning was notably altered and the serum was milky. This turbidity had persisted for more than five years. After a month of treatment (30 mg. of active substance per os daily) the values were clearly better, practically halved, and the serum had become limpid. After having carried out the treatment for several months, an interruption for 43 days caused a rise in the lipidic values, especially in esterified fatty acids, cholesterol and beta-lipoproteins; the serum had return to be being opalescent.

When treatment was resumed, the values fell and the serum has again become clear.

(III) In a third case, in which the patient had an arteriosclerotic arteritis of both inferior limbs, with claudicatio intermittens and spontaneous nocturnal pains, the treatment was carried out for many months. After about two months, during which 30 mg. of active substance daily were administered, the disappearance of claudicatio and of the pains was noticed. The oscillometric index of the inferior limbs augmented progressively, to become practically normal. From these data it seems likely to have had an influence on the arteriopathy. The lipidic status has, an usual, clearly improved with treatment.

What is claimed is:

1. A method of treating hyperlipemia in humans, which comprises administering perorally, parenterally or by suppository to a human in a condition to benefit therefrom an anti-hyperlipemically effective amount of Isatin.

2. The method according to claim 1, wherein there is administered an anti-hyperlipemically effective amount of Isatin within the range of from 0.5 to 300 mg. per day.

3. The method according to claim 2, wherein there is administered an anti-hyperlipemically effective amount of Isatin of 30 mg. per day.

4. The method according to claim 3, wherein the daily dose is divided into three doses of 10 mg. of Isatin per day.

5. The method of claim 1, wherein there is administered a composition comprising an antihyperlipemically effective amount of Isatin and a solid pharmaceutically acceptable vehicle.

References Cited

FOREIGN PATENTS 898,855   6/1962   Great Britain _____ 424—274

OTHER REFERENCES

Chemical Abstracts, vol. 58, column 1831 (1962).
Chemical Abstracts, vol. 72: 74963z (1970).

JEROME D. GOLDBERG, Primary Examiner

V. C. CLARKE, Assistant Examiner

U.S. Cl. X.R.

424—111, 308, 319